July 8, 1952 W. A. JACOB, JR., ET AL 2,602,806
HYDROGENATION PROCESS
Filed April 27, 1950
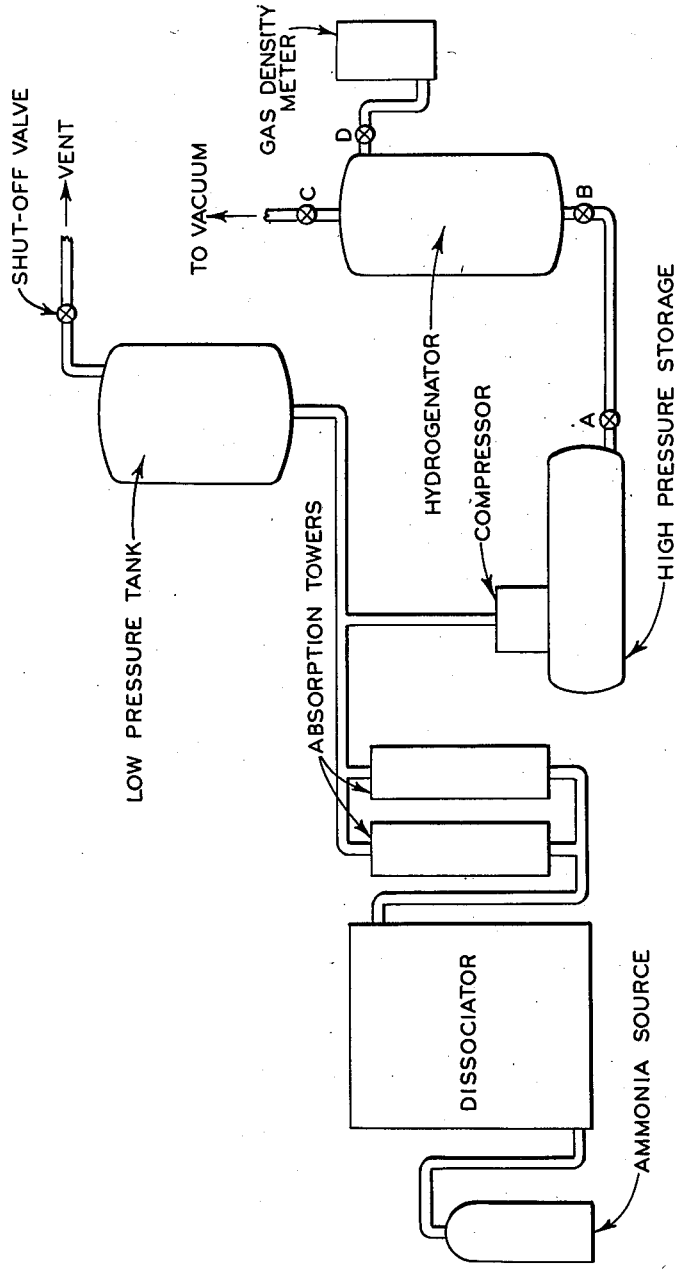
INVENTORS:
William A. Jacob Jr. and
Arthur D. Van de Erve,
BY Carl C. Batz
ATTORNEY.

Patented July 8, 1952

2,602,806

UNITED STATES PATENT OFFICE 2,602,806

HYDROGENATION PROCESS

William A. Jacob, Jr., Houston, Tex., and Arthur D. Van de Erve, Chicago, Ill., assignors to Armour and Company, Chicago, Ill., a corporation of Illinois Application April 27, 1950, Serial No. 158,502

5 Claims. (Cl. 260—409)

This invention relates to a hydrogenation process. It is particularly useful in the hydrogenation of triglycerides and fatty acids; it is also useful in the hydrogenation of nitriles to form amines, and it is useful in treating all compounds containing a group which is unsatisfied with respect to the amount of hydrogen with which it can react.

This application is a continuation-in-part of our copending application Serial No. 707,266, filed November 1, 1946, now abandoned, for Hydrogenation Process.

An object of the invention is to provide a process in which hydrogen and nitrogen obtained by disassociating ammonia are employed in the hydrogenation step while providing means for venting or purging nitrogen together with a small amount of unused hydrogen and while utilizing the hydrogen in a high degree of efficiency. Yet another object is to provide a process whereby nitrogen and hydrogen obtained through disassociating ammonia are utilized free of water for the effective treatment of triglycerides and other organic compounds, the residual ammonia obtained in the disassociation operation being entirely removed prior to the hydrogenation step.

A further object is to provide a process in which material to be hydrogenated is introduced into a hydrogenation chamber under vacuum and heated under vacuum conditions, after which hydrogen and nitrogen obtained by disassociating ammonia are introduced through the heated body and in the presence of a catalyst to bring about the hydrogenation reaction, a controlled withdrawal of the gases being effected to provide a substantially continuous process. Yet another object is to introduce hydrogen and nitrogen obtained from disassociated ammonia into a hydrogen chamber and through the body to be hydrogenated while controlling the withdrawal of gases in a manner such as to provide a substantially continuous process in which hydrogen is utilized in the hydrogenation step at a high selected efficiency. Other specific objects and advantages will appear as the specification proceeds.

The invention is illustrated in the accompanying drawing by a diagrammatic showing of apparatus in which the process may be conveniently carried out.

The ammonia passes from any suitable source into a disassociator, which is a device of well-known structure and operation and in which the ammonia is broken down into hydrogen, nitrogen, and residual ammonia.

The residual ammonia is undesired for the further operations. While the ammonia might be removed by scrubbing with water, this operation results in the carrying of water into later operations, and we wish to avoid for most of such operations the introduction of water. Adsorption towers are provided in which aluminum oxide or any other suitable adsorbing materials may be used. The towers are preferably arranged in parallel so that they may be used alternatively, the aluminum oxide in the unused tower being reactivated by blowing heated air over the pellets.

The resulting hydrogen and nitrogen, freed of the residual ammonia, pass to a low pressure tank suitable as a storage tank, and also to a compressor or high pressure storage tank. From the high pressure storage tank, a line leads to the hydrogenator, control valves being placed within the line. A line leads from the top of the hydrogenator to any suitable source of vacuum, and this line is controlled by a valve. A gas withdrawal line leads from the hydrogenator to a gas density meter or to any other suitable gas analyzer device, and a control valve is placed in this line.

Disassociation of liquid ammonia is well known, and the dissassociator indicated in the drawing is a well-known device. It consists of a catalyst chamber enclosed in an electrically-heated, automatically-controlled furnace. The liquid ammonia is cracked in this apparatus at a relatively high temperature, say from 1,200° to 1,700° F. and at relatively low pressures. Usually the outgoing hot gases are cooled in a countercurrent arrangement for heating the incoming ammonia vapors.

In the operation of one embodiment of the invention, a suitable material for hydrogenation, such as, for example, lard, is introduced into the hydrogenator, all of the valves being closed except the valve leading to the vacuum source. The material in the hydrogenator is heated to a suitable hydrogenation temperature, say for example about 200° F., under vacuum, and preferably with mechanical agitation.

Liquid ammonia is disassociated and led through one of the absorption towers for the removal of the residual ammonia. The resulting nitrogen and hydrogen pass to the low pressure tank, and some are drawn to the compressor and are passed into the high pressure storage tank. Here the gases may be compressed to any desired pressure, say for example to about 190 pounds per square inch absolute. At this time the high pressure storage tank and the hydrogenator are isolated from the rest of the system, the valves A, B, C and D being closed. At this time, valve B is opened wide and valve A is slowly opened. The gases flow through valve A and enter the hydrogenator, causing the pressure therein to rise. When a suitable pressure for hydrogenation is reached, agitation is again preferably applied to the material and hydrogenation is begun.

In the operation of the process, we provide a method for the constant removal of nitrogen and unused hydrogen so that the process may be operated continuously, the control being such that the quantity of nitrogen removed substantially equals the nitrogen input into the hydrogenator while at the same time removing a relatively small amount of hydrogen. By "continuously" is meant that the reaction is proceeding simultaneously with the introduction of one of the reactants into the apparatus. To bring about this control, we employ a device connected with the gas withdrawal line and which will indicate the proportions of the gases withdrawn at any instant. By regulating the control valve D and observing the proportions of the gases withdrawn, as indicated by the gas analyzer or gas density meter, we can select and maintain a rate of withdrawal which will purge the gases in the desired proportions.

It will be understood that any suitable gas analyzer device may be employed. Since such structures are well known, a description here is believed unnecessary. Some of the devices analyze the proportions in a chemical operation, while others indicate the proportions by gas density. As a specific example, a gas density meter, such as the meter known as "Ranarex," may be employed which indicates a gas density at any particular instant.

In the use of the gas density meter, a selected density is made which will require that the gas withdrawn contain a certain proportion of nitrogen and a certain proportion of hydrogen.

By maintaining the control valve D at such a point that the specific gravity recorded by the gas density meter is between 0.79 and 0.80, an accurate control is obtained so that substantially all of the nitrogen and a relatively small proportion of the hydrogen are removed while at the same time maintaining a high efficiency of hydrogen usage. Should the instrument indicate a change from this density, the control valve D is immediately operated again to bring the instrument indicator back to the selected specific gravity.

It will be understood that the selection of a specific gravity as a means for obtaining the purging of the desired relative amounts of nitrogen and hydrogen is based upon an assumed or desired efficiency of hydrogen usage. Should a different efficiency or usage be desired, the rate of withdrawal will be modified so as to maintain the instrument indicator at a different specific gravity. Should a chemical gas analyzer be employed rather than the gas density meter, the operation will be the same because the operator will throttle valve D until the instrument indicates that the proportions of the withdrawn gases are those desired.

In the foregoing operation, the nitrogen serves a valuable function in mechanically agitating the body of liquid to be hydrogenated as it passes therethrough. It is a desirable gas for this purpose because of its inert character and because it does not tend to poison the nickel catalyst.

Th new process is of great value because it permits hydrogen to be obtained, together with an agitating inert gas, from a source which can be readily and easily transported, namely liquid ammonia. To ship hydrogen for any substantial distance requires excessively large containers, and the expense is disproportionately high. Further, to attempt to produce hydrogen at small plants is economically unsound. By employing, however, liquid ammonia, the desired small amounts of hydrogen can be obtained at small plants through the use of a relatively inexpensive cracking apparatus, and the process herein set out for controlling the flow of the gases enables the hydrogenation process to be carried through continuously and with a high degree of utilization of the hydrogen. A further advantage is that in the cracking of ammonia, hydrogen and nitrogen can be obtained at relatively high pressure, say at 100 pounds, and such pressures are sufficient, without the use of a compressor, for supplying the necessary pressure in a hydrogenation step. In other words, with the process described, the compressor may be eliminated in a small plant and hydrogen and nitrogen readily recovered from ammonia at pressures which supply the necessary pressure for hydrogenation. At the same time, the process is rendered highly efficient in the utilization of hydrogen and may be continuous. Water is excluded so that there is no possibility of its reacting with fat at high temperatures to give glycerol and fatty acids and thus produce decreased yields in the hydrogenation step.

With the new process, it is unnecessary to recycle the hydrogen and nitrogen through the liquid body, and a high utilization of the hydrogen is effected through a single pass of the hydrogen through the liquid. By withdrawing nitrogen as described, high efficiency is obtained, and such recycling is made unnecessary.

The process is useful with any organic compounds containing a group that is unsatisfied with respect to the amount of hydrogen with which it can react. The process has been carried on with exceptionally good results with triglycerides, in converting nitriles to amines, in reducing the iodine value of unsaturated fatty acids to 4 and below. The process is particularly effective in the hydrogenation of lard to flakes. As specific examples, the following may be set out:

*Example I*

Lard was treated in the hydrogenator at a temperature of from 266–302° F. with an iodine value change during the whole period of 22.9, the duration of the treatment being 30 minutes. The iodine value drop per minute was 0.764. The cubic feet of hydrogen consumed per unit of iodine per ton was 31.2, and the final iodine value was 47.1. This product was rerun in the hydrogenator for a period of 20 minutes within a temperature range of 302–370° F. with an iodine value change during this time of 25.3, the iodine value drop per minute being 1.265 and the cubic feet of hydrogen consumed per unit of iodine per ton being above 28.3. The iodine value of the final product was 21.8. The latter product was retreated in the hydrogenator for 115 minutes within a temperature range of 362–370° F., with a change in iodine value during the period of 21.0, the iodine value drop per minute being 0.183. The final iodine value was 0.8. In the above example, a gas density meter was employed and was maintained at a setting of 0.80 specific gravity (80% $N_2$ + 20% $H_2$).

Example II

In another run, lard was treated in the hydrogenator for a period of 51 minutes and at a temperature of 254–365° F. The total iodine value drop during the period was 26.2, the final iodine value being 43.8. The product was rerun in the hydrogenator for a period of 70 minutes within a temperature range of 345–368° F., with a total iodine value change of 23.2, the final product having an iodine value of 20.6. This product was rerun for a period of 134 minutes and at a temperature of 361–365° F., the total iodine value drop being 17.8 and the final product having an iodine value of 2.8. The latter product was rerun for a period of 246 minutes within a temperature range of 354–358° F., with a total iodine value drop of 2.3, the final product having an iodine value of 0.5. In Example II, a gas density meter was employed and was maintained at a setting of 0.80 specific gravity.

Example III

Lard having an iodine value of 70 was hydrogenated for a period of 53 minutes within a temperature range of 288–363° F., the iodine value drop during this period being 21.3 and the cubic feet of hydrogen consumed per unit iodine value per ton being 31. The product had an iodine value of 48.7. This product was rerun for 50 minutes within a temperature range of 279–362° F. and produced a total iodine value drop of 21, the cubic feet of hydrogen consumed being 32.5 and the final product having an iodine value of 27.7. The latter product was rerun for a period of 167 minutes at temperatures of 358–366° F. to produce an iodine value drop of 16.9. The cubic feet of hydrogen consumed per unit iodine value per ton was 37.2, the final product having an iodine value of 10.8. In Example III, a gas density meter was employed and was maintained at a setting of 0.80 specific gravity.

In each of the above three examples the average values were about as follows:

Averaged C. F. hydrogen/I. V./ton=30.4
Averaged I. V. drop/min.=0.39
Averaged H₂ use efficiency=93%

Example IV

A tallow nitrile weighing 10 pounds was hydrogenated in 18 minutes at 100–150° C. and under a gauge pressure range (p. s. i.) of 178–182 pounds with an apparent yield of 40.1% of primary amines. This product was rehydrogenated for 60 minutes at temperatures of 150–169° C. at pressures of 178–185 pounds to obtain an apparent yield of 88.5%.

Another sample weighing 10 pounds was hydrogenated for 30 minutes at temperatures of 100–150° C. and under pressures of 183–185 pounds to produce an apparent yield of 46.4% of primary amines. This product was rehydrogenated for 30 minutes at temperatures of 150–182° C. and at pressures of 180–183 pounds to give an apparent yield of 80.3%. A hydrogenation of the product for 30 minutes at temperatures of 179–153° C. and pressures of 175–180 pounds gave an apparent yield of 87.7% and an actual yield of 85.3%.

A third sample of such a nitrile in an amount of 5 pounds was hydrogenated for 76 minutes at temperatures of 100–166° C. and under a pressure of 190–193 pounds to give an apparent yield of 94.3% of primary amines and an actual yield of 91.4%.

Example V

A cut of fatty acids was hydrogenated in a 5-pound sample in a one-gallon size hydrogenator using hydrogen and nitrogen from disassociated ammonia and in the presence of a Rufert nickel catalyst. The time of the hydrogenation was 90 minutes, the temperatures 115–235° C., and the gauge pressure range (p. s. i.) 172–185 pounds, the final product having an iodine value of 4.4. A number of other samples of unsaturated fatty acids were similarly treated and in each instance the iodine value of the resulting product was less than 5.

In accomplishing these results the gas density of the withdrawn gas is maintained between .5 and .95. A preferred range of efficiency in hydrogen utilization is 75 to 85% and similarly the density of the withdrawn gases is preferably maintained in the range of .75–.85.

Example VI

In each of the following test operations, 10,000 pounds of lard were hydrogenated with dissociated ammonia using 0.11% reduced nickel formate catalyst. A hydrogen use of efficiency of 88% (purge gas specific gravity 0.75) was selected and maintained in all cases. The 10,000 pound capacity saturator was equipped with a dual turbo mixer. The results were as follows:

| Run No. | Hydrogenation Time-Minutes | Temperature Start | Degrees Fahrenheit Finish | Saturator Pressure, p. s. i. | Final Iodine Value |
|---|---|---|---|---|---|
| 1 | 145 | 275 | 435 | 130 | 4.3 |
| 2 | 140 | 260 | 415 | 110 | 6.9 |
| 3 | 150 | 280 | 435 | 100 | 5.2 |

Example VII

In each of the following runs or test operations, 100 pounds of refined, water-washed and bleached soybean oil was hydrogenated with dissociated ammonia, using .09% reduced nickel formate catalyst. The saturator had a capacity of 100 pounds and was equipped with a turbo mixer. The results were as set out in the following table:

| Run No. | Hydrogen Use Efficiency | Temperature | | Saturator Pressure, p. s. i. | Time Minutes | Iodine Value | |
|---|---|---|---|---|---|---|---|
| | | Start | Finish | | | Start | Finish |
| | Percent | °F. | °F. | | | | |
| 2 | 90.0 | 295 | 397 | 53 | 81 | 126.8 | 51.6 |
| 4 | 84.3 | 297 | 409 | 50 | 35 | 126.8 | 71.8 |
| 6 | 94.5 | 295 | 391 | 51 | 80 | 126.8 | 58.6 |
| 8 | 77.8 | 295 | 414 | 48 | 28 | 126.8 | 19.5 |
| 9 | 47.9 | 297 | 431 | 47 | 51 | 126.8 | 36.1 |

Example VIII

In the following test operation, as well as in Examples IX, X, and XI, a saturator was employed having a one gallon capacity and equipped with a paddle agitator. A cut of fatty acids (Neo-Fat 3-R), obtained by distillation of the fatty acids split from the foots obtained by refining cottonseed and soybean oils, was hydrogenated. The fatty acid cut had the following composition: 2% stearic acid, 51% oleic acid and 47% lineoleic acid. The original iodine value was 135. One gallon of this material was hydrogenated for a period of 130 minutes, using 0.1% of reduced nickel formate catalyst. The saturator pressure was held at 66 p. s. i. and the starting temperature was 164° C. The final iodine value was 7.2 and the hydrogen use efficiency was held at 92% (purge gas specific gravity .81). The final temperature was 226° C.

*Example IX*

A second sample of fatty acids (D. D. Corn Oil), obtained by the distillation of pitch residues after Neo-Fat 3-R had been distilled off, was hydrogenated. This sample had an original iodine value of 142.7 and consisted of 8% palmitic acid, 3% stearic acid, 20% oleic acid and 69% linoleic acid. The hydrogenation conditions were: 0.1% reduced nickel formate catalyst, 66 p. s. i. saturator pressure, time 96 minutes, starting temperature 155° C., final temperature 285° C., hydrogen use efficiency held at 48% (purge gas specific gravity .40). The final iodine value was 10.2.

*Example X*

One gallon of a tallow nitrile (Arneel T) was hydrogenated. This nitrile was prepared from catch basin skimmings of vegetable oil origin. The conditions of hydrogenation were as follows: The nitrile was made basic with 50% caustic soda solution and 1.0% of Raney nickel catalyst was added. This mixture was hydrogenated with dissociated ammonia at a pressure of 90 p. s. i. for a period of 12 hours with a hydrogen utilization efficiency of 95% (purge gas specific gravity of .88). The starting temperature was 105° C. and the final temperature 163° C. The product had a yield of 41.7% primary amine.

*Example XI*

One gallon of acetone was hydrogenated with dissociated ammonia, using a saturator pressure of 60 p. s. i. for a period of 3 hours with 0.5% of platinum oxide catalyst. The temperature was held at 80° C. and the hydrogen utilization efficiency was held at 57.5% (purge gas specific gravity .45). A yield of 21% isopropyl alcohol was obtained.

As indicated in Example IX of applicants' process, the specific gravity of the withdrawn gas may be as low as .4. Further, as indicated in Example X of the process, the purge gas specific gravity may be as high as .88. While the specific gravity of the purge gases may be from .4 to .88, the preferred range of specific gravity is .75 to .85.

While in the foregoing specification we have set forth certain steps in great detail for the purpose of illustration, it will be understood that such details may be varied widely by those skilled in the art without departing from the spirit of our invention.

We claim:

1. In a hydrogenation process in which the material to be hydrogenated is maintained under reaction conditions of temperature and pressure, the steps of introducing into the hydrogenation system nitrogen and hydrogen in the proportions in which they exist as disassociated products of ammonia, and continuously withdrawing a stream of mixed gases having a specific gravity of .4 to .88.

2. In a hydrogenation process in which the material to be hydrogenated is maintained under reaction conditions of temperature and pressure, the steps of introducing into the hydrogenation system nitrogen and hydrogen in the proportions in which they exist as disassociated products of ammonia, and continuously withdrawing a stream of mixed gases having a specific gravity of .75 to .85.

3. In a process for the hydrogenation of a material selected from the group consisting of fatty acids and fatty acid triglycerides, and in which the material is maintained in a hydrogenation system in contact with hydrogen under reaction conditions of temperature and pressure, the steps of introducing into the hydrogenation system nitrogen and hydrogen in the proportion in which they exist as disassociated products of ammonia, and withdrawing mixed gases from the system in a stream having a specific gravity of .4 to .88.

4. In a process for the hydrogenation of a material selected from the group consisting of fatty acids and fatty acid triglycerides, and in which the material is maintained in a hydrogenation system in contact with hydrogen under reaction conditions of temperature and pressure, the steps of introducing into the hydrogenation system nitrogen and hydrogen in the proportion in which they exist as disassociated products of ammonia, and withdrawing mixed gases from the system in a stream having a specific gravity of .75 to .85.

5. In a process for the hydrogenation of a material selected from the group consisting of fatty acids and fatty acid triglycerides, and in which the material is maintained in a hydrogenation system in contact with hydrogen under reaction conditions of temperature and pressure, the steps of introducing into the hydrogenation system nitrogen and hydrogen in the proportion in which they exist as disassociated products of ammonia, and continuously withdrawing a stream of the mixed gases having a specific gravity of about 0.8.

WILLIAM A. JACOB, JR.
ARTHUR D. VAN DE ERVE.

REFERENCES CITED

The following references are of record in the file of this patent:

UNITED STATES PATENTS

| Number | Name | Date |
|---|---|---|
| 2,014,999 | Barradas | Sept. 17, 1935 |

OTHER REFERENCES

Mellor's "Modern Inorganic Chemistry," page 650, Jan. 1935, Longmans, Green & Co., N. Y.

Van de Erve et al., Jr. Am. Oil Chem. Soc. vol. 25 (1948), pgs. 60-63.